(12) United States Patent
Ryan, Jr.

(10) Patent No.: US 6,691,183 B1
(45) Date of Patent: Feb. 10, 2004

(54) SECOND TRANSFER LOGIC CAUSING A FIRST TRANSFER LOGIC TO CHECK A DATA READY BIT PRIOR TO EACH OF MULTIBIT TRANSFER OF A CONTINOUS TRANSFER OPERATION

(75) Inventor: Lawrence H. Ryan, Jr., Warren, VT (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 09/314,487

(22) Filed: May 18, 1999

Related U.S. Application Data

(60) Provisional application No. 60/086,085, filed on May 20, 1998.

(51) Int. Cl.[7] .......................... G06F 13/28; G06F 13/42
(52) U.S. Cl. .......................... 710/35; 710/33; 710/105
(58) Field of Search .......................... 710/5, 8, 10, 33, 710/35, 305, 308, 310, 105–107, 110

(56) References Cited

U.S. PATENT DOCUMENTS

| | | |
|---|---|---|
| 3,810,119 A | 5/1974 | Zieve et al. |
| 3,825,905 A | 7/1974 | Allen Jr. |
| 4,096,566 A | 6/1978 | Borie et al. |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,410,942 A | 10/1983 | Milligan et al. |
| 4,423,486 A | 12/1983 | Berner |
| 4,428,044 A | 1/1984 | Liron |
| 4,435,762 A | 3/1984 | Milligan et al. |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,609,995 A | 9/1986 | Hasebe |
| 4,615,001 A | 9/1986 | Hudgins, Jr. |
| 4,628,437 A | 12/1986 | Poschmann et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |

(List continued on next page.)

OTHER PUBLICATIONS

"Agenda," ISA/SP50—1988–180, ISA Draft.
Application of PRIAM Model to Safety Systems on Offshore Oil/Gas Platforms. Silvertech Ltd., Jan. 9, 1995.
"Automation System Monitors, Controls Fab HVAC, Other Systems," *Microcontamination* (Aug. 1994).

(List continued on next page.)

*Primary Examiner*—Ilwoo Park
(74) *Attorney, Agent, or Firm*—David J. Powsner; Nutter, McClennen & Fish LLP

(57) ABSTRACT

A digital device interface for transferring information between a processor and a control device includes a first serial peripheral interface (SPI), e.g., with "data in," "data out" and "clock" ports, in serial communication with a second SPI. The first SPI can be coupled to, and associated with, the processor; the second SPI, with the control device. A first transfer logic section, e.g., a shift register engine, transfers bytes, word, longwords or other multi-bit datum between the processor and the control device. A second transfer logic section effects a transfer transaction between the processor and the control device—that is, the transfer of plural multi-bit datum relating to a common data access operation or a common data generation operation. For sensor-type control devices, such a transaction may include, for example, the "continuous" transfer of data sensed by the device. For a servo, actuator, or the like, the transaction may include, for example, a stream of set points or other control data generated by the processor (and/or its related data stores) for application to the control device.

12 Claims, 4 Drawing Sheets

U.S. PATENT DOCUMENTS

| | | |
|---|---|---|
| 4,672,530 A | 6/1987 | Schuss |
| 4,675,812 A | 6/1987 | Capowski et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Deyesso et al. |
| 4,742,349 A | 5/1988 | Miesterfeld et al. |
| 4,750,109 A | 6/1988 | Kita |
| 4,790,762 A | 12/1988 | Harms et al. |
| 4,805,107 A | 2/1989 | Kieckhafer et al. |
| 4,816,996 A | 3/1989 | Hill et al. |
| 4,817,094 A | 3/1989 | Lebizay et al. |
| 4,872,106 A | 10/1989 | Slater |
| 4,910,658 A | 3/1990 | Dudash et al. |
| 4,910,691 A | 3/1990 | Skeirik |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,129,087 A | 7/1992 | Will |
| 5,134,574 A | 7/1992 | Beaverstock et al. |
| 5,136,704 A | 8/1992 | Danielsen et al. |
| 5,138,708 A | 8/1992 | Vosbury |
| 5,146,589 A | 9/1992 | Peet, Jr. et al. |
| 5,151,981 A | 9/1992 | Westcott et al. |
| 5,162,986 A | 11/1992 | Graber et al. |
| 5,163,055 A | 11/1992 | Lee et al. |
| 5,166,685 A | 11/1992 | Campbell, Jr. et al. |
| 5,168,276 A | 12/1992 | Huston et al. |
| 5,175,829 A | 12/1992 | Stumpf et al. |
| 5,193,175 A | 3/1993 | Cutts, Jr. et al. |
| 5,212,784 A | 5/1993 | Sparks |
| 5,233,615 A | 8/1993 | Goetz |
| 5,255,367 A | 10/1993 | Bruckert et al. |
| 5,258,999 A | 11/1993 | Wernimont et al. |
| 5,271,013 A | 12/1993 | Gleeson |
| 5,283,729 A | 2/1994 | Lloyd |
| 5,289,365 A | 2/1994 | Caldwell et al. |
| 5,295,258 A | 3/1994 | Jewett et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,372 A | 4/1994 | Sawyer et al. |
| 5,317,726 A | 5/1994 | Horst |
| 5,335,221 A | 8/1994 | Snowbarger et al. |
| 5,347,181 A | 9/1994 | Ashby et al. |
| 5,349,343 A | 9/1994 | Oliver |
| 5,352,033 A | 10/1994 | Gresham et al. |
| 5,359,721 A | 10/1994 | Kempf et al. |
| 5,381,529 A | 1/1995 | Matsushima |
| 5,390,321 A | 2/1995 | Proesel |
| 5,398,331 A | 3/1995 | Huang et al. |
| 5,400,140 A | 3/1995 | Johnston |
| 5,410,717 A | 4/1995 | Floro |
| 5,428,781 A | 6/1995 | Duault et al. |
| 5,434,997 A | 7/1995 | Landry et al. |
| 5,444,851 A | 8/1995 | Woest |
| 5,450,403 A | 9/1995 | Ichii et al. |
| 5,450,425 A | 9/1995 | Gunn et al. |
| 5,450,764 A | 9/1995 | Johnston |
| 5,451,939 A | 9/1995 | Price |
| 5,457,797 A | 10/1995 | Butterworth et al. |
| 5,459,839 A | 10/1995 | Swarts et al. |
| 5,463,735 A | 10/1995 | Pascucci et al. |
| 5,475,856 A | 12/1995 | Kogge |
| 5,481,741 A | 1/1996 | McKaskle et al. |
| 5,483,660 A | 1/1996 | Yishay et al. |
| 5,485,620 A | 1/1996 | Sadre et al. |
| 5,504,902 A | 4/1996 | McGrath et al. |
| 5,509,811 A | 4/1996 | Homic |
| 5,513,095 A | 4/1996 | Pajonk |
| 5,513,192 A | 4/1996 | Janku et al. |
| 5,513,354 A | 4/1996 | Dwork et al. |
| 5,517,655 A | 5/1996 | Collins et al. |
| 5,519,701 A | 5/1996 | Colmant et al. |
| 5,522,044 A | 5/1996 | Pascucci et al. |
| 5,530,643 A | 6/1996 | Hodorowski |
| 5,539,909 A | 7/1996 | Tanaka et al. |
| 5,544,008 A | 8/1996 | Dimmick et al. |
| 5,550,980 A | 8/1996 | Pascucci et al. |
| 5,551,047 A | 8/1996 | Mori et al. |
| 5,555,213 A | 9/1996 | DeLong |
| 5,555,437 A | 9/1996 | Packer |
| 5,555,510 A | 9/1996 | Verseput et al. |
| 5,559,963 A | 9/1996 | Gregg et al. |
| 5,568,378 A | 10/1996 | Wojsznis |
| 5,572,673 A | 11/1996 | Shurts |
| 5,576,946 A | 11/1996 | Bender et al. |
| 5,579,299 A * | 11/1996 | Halter et al. ............... 370/212 |
| 5,579,487 A | 11/1996 | Meyerson et al. |
| 5,581,760 A | 12/1996 | Atkinson et al. |
| 5,586,112 A | 12/1996 | Tabata |
| 5,586,329 A | 12/1996 | Knudsen et al. |
| 5,586,330 A | 12/1996 | Knudsen et al. |
| 5,587,899 A | 12/1996 | Ho et al. |
| 5,594,899 A | 1/1997 | Knudsen et al. |
| 5,596,752 A | 1/1997 | Knudsen et al. |
| 5,600,845 A | 2/1997 | Gilson |
| 5,604,871 A | 2/1997 | Pecone |
| 5,611,057 A | 3/1997 | Pecone et al. |
| 5,613,148 A | 3/1997 | Bezviner et al. |
| 5,617,540 A | 4/1997 | Civanlar et al. |
| 5,627,979 A | 5/1997 | Chang et al. |
| 5,629,949 A | 5/1997 | Zook |
| 5,630,056 A | 5/1997 | Horvath et al. |
| 5,630,152 A | 5/1997 | DeLuca et al. |
| 5,642,511 A | 6/1997 | Chow et al. |
| 5,649,121 A | 7/1997 | Budman et al. |
| 5,655,092 A | 8/1997 | Ojala |
| 5,659,680 A | 8/1997 | Cunningham et al. |
| 5,664,168 A | 9/1997 | Yishay et al. |
| 5,671,374 A | 9/1997 | Postman et al. |
| 5,676,141 A | 10/1997 | Hollub |
| 5,680,404 A | 10/1997 | Gray |
| 5,680,409 A | 10/1997 | Qin et al. |
| 5,682,476 A | 10/1997 | Tapperson et al. |
| 5,687,316 A | 11/1997 | Graziano et al. |
| 5,701,414 A | 12/1997 | Cheng et al. |
| 5,708,779 A | 1/1998 | Graziano et al. |
| 5,727,128 A | 3/1998 | Morrison |
| 5,748,467 A | 5/1998 | Qin et al. |
| 5,748,684 A * | 5/1998 | Sanchez .................. 375/357 |
| 5,752,007 A | 5/1998 | Morrison |
| 5,752,008 A | 5/1998 | Bowling |
| 5,758,073 A | 5/1998 | Liang et al. |
| 5,758,075 A | 5/1998 | Graziano et al. |
| 5,768,119 A | 6/1998 | Havekost et al. |
| 5,777,874 A | 7/1998 | Flood et al. |
| 5,790,791 A | 8/1998 | Chong et al. |
| 5,793,963 A | 8/1998 | Tapperson et al. |

| | | |
|---|---|---|
| 5,796,602 A | 8/1998 | Wellan et al. |
| 5,797,038 A | 8/1998 | Crawford et al. |
| 5,801,942 A | 9/1998 | Nixon et al. |
| 5,805,922 A * | 9/1998 | Sim et al. ............ 710/5 |
| 5,822,220 A | 10/1998 | Baines |
| 5,828,851 A | 10/1998 | Nixon et al. |
| 5,841,963 A | 11/1998 | Nakamikawa et al. |
| 5,854,944 A | 12/1998 | Catherwood et al. |
| 5,862,052 A | 1/1999 | Nixon et al. |
| 5,872,992 A | 2/1999 | Tietjen et al. |
| 5,873,089 A | 2/1999 | Regache |
| 5,886,658 A * | 3/1999 | Amar et al. ............ 341/155 |
| 5,928,345 A | 7/1999 | Tetzlaff et al. |

OTHER PUBLICATIONS

Batch Control. Part I: Models and Terminology. (Approved Feb. 28, 1995) ISA–S88.0 1995.

Benkhallat, Yazid, et al. "Interoperability of sensors and distributed systems," *Sensors and Actuators* A vol. 37–38 (1993), 247–254.

Blevins, Terry. "Characteristics of Function Block Requirements for the Process Industry and Manufacturing Automation," Fisher–Rosemount, Oct. 31, 1995.

Brunn, P. "Collision Avoidance for Two Robots Sharing a Common Workspace," (1995) The Institution of Electrical Engineers.

Burton, P. I. "A personal history of batch control," *Measurement + Control* vol. 27 (Apr. 1994), pp. 69–73.

Burton, P. I., et al. "Field Bus Based on MIL–STD–1553B: Proposal to ISA–SP–50" ERA Technology Ltd. (Apr. 6, 1988) ISA/SP50–1988–148.

Capetta, L., et al. "From Current Actuators and Transmitters Towards Intelligent Actuation and Measurement: PRIAM Approach," BIAS 93.

Caro, Richard H. "Field Bus Applications," ISA (1989) Paper #89–0569, pp. 989–994.

Caro, Richard H. "The Fifth Generation Process Control Architecture," ISA (1988) Paper #88–1487, pp. 659–667.

Caro, Richard H. "The Fifth Generation Process Control Architecture," *ISA Transactions* vol. 28 No. 4 (1989), pp. 23–28.

Chettle, Tim. "Multiplexing techniques optimise data collection," *Electrotechnology* (Oct./Nov. 1995).

Coleman, Vernon. "National Electrical Manufacturers Association Field Bus Report to ISA SP50," (Oct. 1988) ISA/SP50–1988–234.

Conference Record of the 1993 IEEE Industry Applications Conference, Part III (excerpt).

Contents, Proceedings of the Second International Workshop on Configurable Distributed Systems, Mar. 21–23, 1994, Pittsburgh, PA.

Craig, Lynn W. "SP–88 Defines Batch Control," *INTECH* Mar. 1994, pp. 34–37.

Crowder, R. S. "A Communication Architecture for Automation & Control", 16A, pp. 669–673.

Crowder, R. S.. "Generic Data Link Transactions for Simple Devices," Proposal to ISA SP 50 & IEC/SC65C/WG6 (Oct. 15, 1988) ISA Document.

Delahostria. Communication Model Application Layer. (Oct. 14, 1988) ISA/SP50–1988 247, ISA Draft.

Delfino, B. and Pinceti, P. "Fieldbus Applications for Electrical Industrial Systems," *IEEE* (3993), pp. 2084–2090.

Dezso, Danyi. "Halozati szabalyozas," *Meres es Automatika* vol. 37 (1989), pp. 208–213.

Editing Committee Draft Application Layer, Version 6, Dec. 1990.

Editing Committee Draft Application Layer, Version 8, May 1991.

Editing Committee Draft Application Layer, Version 12, Oct. 1991.

Espirit Project 1688, "PRIAM Dictionary: Major Terms and Definitions Used in the PRIAM Project," Prenormative Requirements for Intelligent Actuation and Measurement, May 1995.

Esprit Project 8244, "User Requirements for Intelligent Transmitters and Actuators," European Intelligent Actuation and Measurement User Group, Nov. 24, 1995.

Fieldbus Standard for Use in Industrial Control Systems. Part 2: Physical Layer Specification and Service Definition. (1992) ANSI/ISA–S50.02.

Foxboro Fieldbus Proposal (Presented to ISA SP–50 Committee Feb. 24, 1988) ISA/SP50–1988–123B, ISA Draft.

Furness, Harry. "Fieldbus: The Differences Start From the Bottom Up," *Control Engineering* (Mar. 1994), pp. 75–77.

Holding, David and Wood, Graham. "Communications in microprocessor industrial implementation," *Microprocessors and Microsystems* vol. 3 No. 10 (Dec. 1979), pp. 443–451.

Johnson, Dick. "Pressure Sensing Advances: Are They in Your Process' Future?" *Control Engineering* (Apr. 1995), pp. 67–72.

Kelly, D. Mark. "Digital fieldbus cluster cuts plant's wiring costs up to 20%," *INTECH* (Apr. 1995), pp. 62–64.

Köth, H. and Oeder, K. "The Advantages of Intelligent Field Modules for Nuclear Power Plant Operation and Maintenance," Kerntechnik 60 (1996) 5–6, pp. 215–219.

Lenhart, Gerald W. "A Field Bus Approach to Local Control Networks," ISA, Paper #93–28 1993.

Lenhart, Gerald W. "Fieldbus–Based Local Control Networks," *INTECH* (Aug. 1994), p. 31–34.

Loose, Graham. "Fieldbus—the user's perspective," *Measurement+Control* Vol 27 (mar. 1994), pp. 47–51.

Meeting Minutes, SP50, International Electrotechnical Combination, Technical Committee No. 65: Industrial–Process Measurement and Control, Sub–Committee 65C: Digital Data Communications for Measurement and Control and Working Group 6: Field Bus Standard for Use in Industrial Control Systems, Feb. 28–Mar. 4, 1988, Scottsdale, AZ.

Meeting Minutes, SP50.4 Application Layer, Oct. 19–21, 1988, Houston, TX.

Meeting Minutes, Windows Group of Application Subcommittee, Mar. 1–3, 1989, New Orleans, LA.

Meeting Minutes, Ad Hoc Function Block Meeting, Jun. 14, 1990, Chapel Hill, NC.

Meeting Minutes, SP50, Signal Compatibility of Electrical Instruments, Dec. 5–7, 1990, Orlando, FL.

Meeting Minutes, Process Control Working Group of SP50.4, Jan. 21–23, 1991, Atlanta, GA.

Meeting Notes, International Electrotechnical Commission Sub Committee No. 65C: Digital Communications Working Group 7, Process Control Function Blocks Report to AMT/ 7. Apr. 4, 1996.

Mirabella, Orazio. "A Short Presentation of IEC Fieldbus Application Layer," Informatics and Communication Institute, Engineering Faculty, University of Catania, Italy.

Morel, G., et al. "Discrete Event Automation Engineering: Outline of the PRIAM Project."

"NCR Fieldbus Slave Controller Advance Information," ISA–SP50–1988–161, ISA Draft.

NOAH: Network Oriented Application Harmonisation based on General Purpose Field Communication System. Project description rev. 1.0, Oct. 25, 1995. P–NET, PROFIBUS, WorldFIP.

Nobuhiko, Tsuji, et al. "An Advanced Optical Fieldbus Instrumentation System Using 16 x 16 Reflection Type Optical Star Coupler and Low Powered Transmitter," pp. 755–764.

Output to Valve, Revision No. 1.4, Jan. 18, 1991, (Draft Document), Instrument Society of America.

Owen, S., et al. "A modular reconfigurable approach to the creation of flexible manufacturing cells for educational purposes," *Fast Reconfigurable of Robotic and Automation Resources* (Colloquium) Oct. 20, 1995, The Institution of Electrical Engineers, Digest No. 95/174.

Pace, Hugh W. "Valve Actuators Ready for Fieldbus," *Control Engineer* (Oct. 1995), pp. 65–73.

Petti, Thomas F. and Dhurjati, Prasad S. "A Coupled Knowledge Based System Using Fuzzy Optimization for Advisory Control," *IChE Journal* vol. 38 (Sep. 1992) No. 9, pp. 1369–1378.

Pfeifer T. and Fussel B. "Sensorbetriebssystem fur messtechnische Problemstellungen in der Produktionstechnik," *Technisches Messen* vol. 58 (1991) Nos. 7/8.

Phinney, Thomas L. "An Analysis of Contending Proposals in ISA SP–50 for an ISA/IEC Field Instrument Bus," ISA (1988) Paper #88–1489.

Preface: Field Bus Process Control User Layer Technical Support, Feb. 10, 1993.

Product Specification, I/A Series ®RBATCH II.

PROWAY–LAN Industrial Data Highway. (Approved Feb. 3, 1986) ISA—S72.01–1985.

"Radio Field Bus," ISA/SP50—1988–184, ISA Draft.

Report from IEC C65 Working Group 6 Function Blocks, May 1, 1995.

Schuur, C. "Comments on 'Analysis and Suggestions for ISA–SP50' as submitted to the SP50 Committee by Honeywell Inc." (Mar. 11, 1988) ISA–SP50–1988–155, ISA Draft.

Schuur, Chris and Warrior, Jay. "Philips Token Passing Field Bus Controller Time Tolren Mode," ISA/SP50—1988–186, ISA Draft.

"SDRD Using 1553B Data Link Services," ISA/SP50–1988–243 (1988).

Skabowski, E. L. "Recommendations for Consideration at Oct., 1988, Application Layer Subcommittee Meeting," (Oct. 3, 1986).

Solvie, Michael J. "Configuration of Distributed Time–Critical Fieldbus Systems," *IEEE* (1994), p. 211.

Strothman, Jim and Ham, John. "Alliances, Fieldbus, Windows Stir ISA/94 Anaheim Pot," *INTECH* (Dec. 1994), pp. 32–35.

Strothman, Jim and Ham, John. "ISA/95 New Orleans: 'Open', NT winds (not Opal) blow strong," *INTECH* (Nov. 1995), pp. 45–48.

"Suggested Outline for Application Sub–committee Document: Fieldbus Architecture Subcommittee Document," ISA/SP50—1988–175, ISA Draft.

Table of Contents, Automation & Technology Department, 1995.

Table of Contents, Automation & Technology Department, 1993.

Table of Contents, Industrial Computing Society (no date).

Table of Contents, Proceedings of the Industrial Computing Conference, vol. 3, Sep. 19–24, 1993, Chicago, IL. Industrial Computing Society.

[Table of Contents], Proceedings of the 20th International Conference on Industrial Electronics Control and Instrumentation, vols. 1–3, Sep. 5–9, 1994, Bolognia, Italy.

[Table of Contents], Proceedings of the 7th Mediterranean Electrotechnical Conference, vol. 1, Apr. 12–14, 1994, Antalya, Turkey.

Table of Contents, ISA/88, Houston, MA, (no date).

Table of Contents, ISA/89, (no date).

Tobin, David. "Southeast Paper Installs Largest Foxboro Distributed Control System."

"User Layer Technical Report," ISA/SP50—1990–389C, ISA Draft.

Weinert, A., et al. "RT/OS—realtime programming and application environment for the COSY control system," *Nuclear Instruments and Methods in Physics Research A* vol. 352 (1994), pp. 277–279.

WG1 List of Criteria (Appendix 1), (Oct. 21, 1988) ISA/SP50–1988–242, ISA Draft.

Wood, G.G. "The Argus CONSUL System for On–Line Computer Control," *Electrical Engineering Transactions* (Mar. 1969), pp. 114–118.

Wood, G. G. "The Challenge of Standards for Plant Communication," IFAC Distributed Computer Control Systems (1982), pp. 191–192.

Wood, G. G. "Current Fieldbus activities," *computer communications* vol. 11 (Jun. 1988) No. 3, pp. 118–123.

Wood, Graeme G. "Data Transmission, Processing and Presentation," pp. 46–54.

Wood, G. G. "Evolution of communication standards for the process industry," *Measurement + Control* vol. 19 (Jul./Aug. 1986), pp. 183–188.

Wood, Graeme. "Fieldbus Status 1995," *Computing & Control Engineering Journal* (Dec. 1995), pp. 251–253.

Wood, Graeme. "Generic Link Transactions for Simple Devices in Fieldbus." ISA/SP50—1988–240 (Sep. 20, 1988.

Wood, Graeme, G. "Standardisation Work for Communication Among Distributed Industrial Computer Control Systems—A Status Report," INRIA (1984), pp. 67–69.

Wood, G. G. "Survey of LANs and Standards," *Computer Standards & Interfaces* vol. 6 (1987), pp. 27–36.

Wood, G. G. "Towards digital information control," *Measurement + Control* vol. 21 (Jul./Aug. 1988), pp. 179–180.

Chapter 7, "Ping Program," pp. 85–96.

*ICCard Design* Sep./Oct. 1995.

Strack, Bob. "The HAWK is Soaring," *Chemical Processing* (May 1996) p. 11.

"Control System Features Plug–and–Play Technology, Scalability," *Chemical Processing* (May 1996), p. 33.

"Editors' Product Picks," *Chemical Processing* (May 1996), p. 34.

* cited by examiner

SECOND TRANSFER LOGIC CAUSING A FIRST TRANSFER LOGIC TO CHECK A DATA READY BIT PRIOR TO EACH OF MULTIBIT TRANSFER OF A CONTINOUS TRANSFER OPERATION

REFERENCE TO RELATED APPLICATIONS

This application claims the benefit of priority of U.S. Provisional Patent Application No. 60/086,085, filed May 20, 1998, the teachings of which are incorporated herein by reference.

BACKGROUND OF THE INVENTION

The invention pertains to control systems and, more particularly, by way of non-limiting example, to methods and apparatus for serial information transfer with control devices.

The terms "control" and "control systems" refer to the control of the operational parameters of a device or system by monitoring one or more of its characteristics. This is used to insure that output, processing, quality and/or efficiency remain within desired parameters over the course of time.

Control is used in a number of fields. Process control, for example, is typically employed in the manufacturing sector for process, repetitive and discrete manufactures, though, it also has wide application in electric and other service industries. Environmental control finds application in residential, commercial, institutional and industrial settings, where temperature and other environmental factors must be properly maintained. Control is also used in articles of manufacture, from toasters to aircraft, to monitor and control device operation.

Control systems typically utilize field devices that are physically integrated into the equipment being controlled. For example, temperature sensors are usually installed directly on or within the articles, bins, or conduits that process, contain or transport the materials being measured. Control devices such as valves, relays, and the like, must also be integrated with the equipment whose operations they govern.

In many control systems, field devices must exchange information with processors and other apparatus that manage or report on them. Brake pad wear sensors in an automobile, for example, transmit readings to a microprocessor elsewhere "under the hood" that monitors overall operations. Sensors and other control devices in process control systems must also exchange information with block and plant controllers that monitor and control broader operational parameters.

The so-called serial peripheral interface, or SPI, is commonly used for transferring information between microprocessors and peripheral devices, as well as between processors themselves. In its most basic form, it requires only three leads or other communications paths between devices. Those paths are commonly referred to as data-in, data-out, and clock.

Information transfers are initiated by the microprocessor or other device designated as the master. It asserts clocking signals on the clock line connecting the devices. With each pulse, the master shifts a bit onto its data-out path for transfer to the peripheral or other "slave" device's data-in path. Later in the same clock cycle, the slave shifts a bit onto its data-out path for receipt at the master's data-in path. This process typically repeats four, eight or more times, with each device collecting bits received from the other in a nibble, byte, word or longword register.

Notwithstanding the popularity of the SPI, it has some drawbacks. One of these is the necessity of continually shifting bits into and out from the data-in and data-out lines. Another is not so much inherent to the SPI as to its universality of application. Because manufacturers can make almost no assumptions about SPI compatible devices, except their ability to transfer bits, a considerable amount of control information must often be exchanged in order to set up each substantive data transfer.

U.S. Pat. No. 4,816,996 represents one prior art solution to these problems. It suggests the use of independent circuitry, referred to as a data serializer, to oversee the bit-wise transfer of individual data words into and out of the SPI. It also suggests that the microprocessor store each datum that is to be transferred in a queue, along with command and control information for the transfer. A queue manager then operates autonomously to execute each individual data transfer.

Though '996 patent and others like it appear to advance the art, still further improvement is desirable. That patent, for example, still necessitates considerable processor activity to support each substantive data transfer. Moreover, it requires extensive hardware in order to support the auxiliary queue management function.

An object of this invention, accordingly, is to provide improved digital device interface apparatus and methods for transferring digital information.

A more particular object is to provide such apparatus and methods as are suitable for use in transferring information with control devices, such as sensors, analog/digital converters, servos, actuators, and the like. A still more particular object of the invention is to provide input/output modules and methods suitable for use with field devices configured for use in process control and in other control systems.

A related object of the invention is to provide such apparatus and methods as are suitable for use with microprocessors, embedded processors and other processors.

Still another object of the invention is to provide such apparatus and methods as are suitable for general application in transferring information between SPI ports, whether or not associated with control devices.

A further object of the invention is to provide such apparatus and methods as demand low computation and hardware overhead.

SUMMARY OF THE INVENTION

The aforementioned objects are among those attained by the invention, which provides in one aspect a digital device interface for transferring information between a processor and a control device. The processor can be, for example, a microprocessor, embedded processor or other general or special purpose digital data processing apparatus. The control device can be, for example, an analog/digital converter, a sensor, an actuator, or other control device for use in process control, environmental control or other control-related applications.

The interface includes a first serial peripheral interface (SPI), e.g., with data-in, data-out and clock ports, in serial communication with a second SPI. The first SPI can be coupled to, and associated with, the processor; the second SPI, with the control device.

A first transfer logic section, e.g., a shift register engine, transfers nibbles, bytes, word, longwords or other multi-bit datum between the processor and the control device. This is done by bit-wise or serial application of multi-bit datum to the first SPI for transfer to the second SPI, and/or reception from the first SPI of a multi-bit datum bit-wise or serially transferred thereto by the second SPI.

Thus, for example, the first transfer logic section can initiate transfer of a byte by asserting clocking signals on the clock line connecting the two SPIs. With each pulse, the first transfer logic shifts a bit onto the first SPI's data-out port for transfer to the second SPI's data-in port. Within the same clock cycle, the control device shifts a bit onto the second SPI's data-out port for transfer to the first SPI's data-in port. This process repeats four, eight or more times, thus transferring a nibble, byte or more in each direction.

A second transfer logic section effects a transfer transaction between the processor and the control device—that is, the transfer of plural multi-bit datum relating to a common data access operation or a common data generation operation. For sensor-type control devices, such a transaction may include, for example, the continuous transfer of data sensed by the device. For a servo, actuator, or the like, the transaction may include, for example, a stream of set points or other control data generated by the processor (and/or its related data stores) for application to the control device.

According to further aspects of the invention, the second transfer logic section effects a transfer transaction by invoking the first transfer logic section for purposes of (i) transferring to the control device one or more multi-bit commands for initiating, e.g., a specific data collection operation, and/or (ii) receiving from the control device one or more multi-bit data containing the desired information. Depending on the operation and device characteristics, the commands can be interleaved with the resulting data (e.g., as where the digital device interface must issue repeated read commands in order to maintain a stream of output from the control device and/or where the the digital device interface must repeatedly check a "data ready" bit to determine when the control device has new data ready for output).

Still further aspects of the invention provide digital interface devices as described above in which the second transfer logic section includes a state machine. The state of that machine can determine which multi-bit datum the second transfer logic section invokes the first transfer logic section to transfer with the control device. For example, initialization states of a given state machine may cause a series of register initializing words to be sent to the control device. Later data transfer states may cause read operations to be sent to the device and resultant data words to be sent back from it.

Other aspects of the invention provide a digital device interface including a first SPI in serial communication with a second SPI. A first transfer logic section transfers multi-bit datum between the SPIs in a serial or bit-wise fashion. A second transfer logic section effects a transfer transaction between the fist and second SPI, where, as above, the transaction encompasses the transfer of plural multi-bit datum relating to a common data access operation or a common data generation operation.

Related aspects of the invention provide such digital device interface in which the second transfer logic section incorporates features and operates in the manner of the like named section of digital device interface described above.

Yet still other aspects of the invention provide methods of transferring information between a processor and a control device and methods of serial digital data transfer paralleling the operations described above.

Advantages of methods and apparatus according to the invention is that they further reduce the processor load otherwise required for handling data transfers over the SPIs. Though suited for a wide range of applications, the methods and apparatus well suited for use in process control and other control applications, which typically utilize embedded processors, microprocessors and other smaller processors.

BRIEF DESCRIPTION OF THE DRAWINGS

A more complete understanding of the invention may be attained by reference to the drawings, in which.

DETAILED DESCRIPTION OF THE INVENTION

Figure 1:
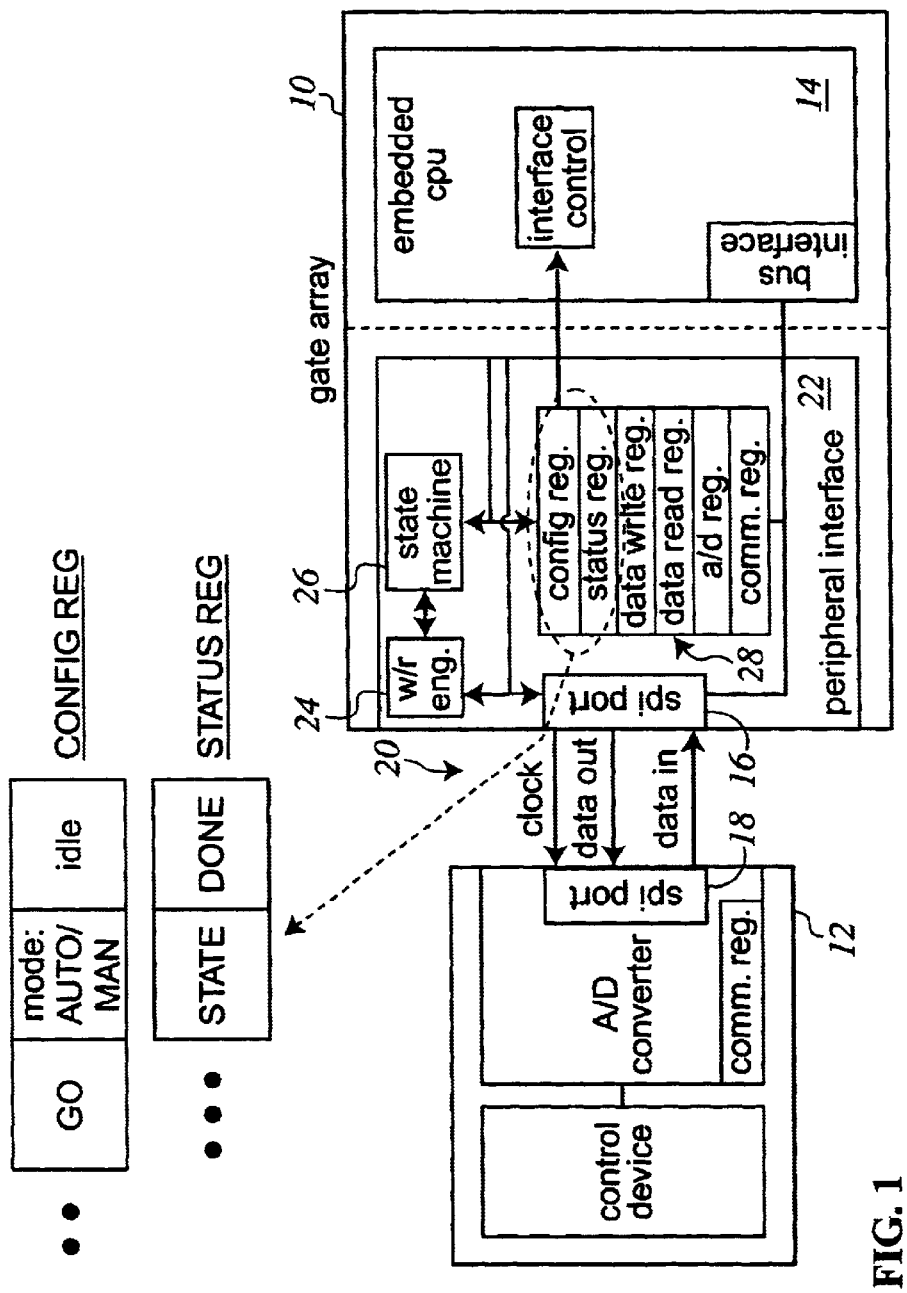
FIG. 1 depicts an embedded processor apparatus in accord with the invention arranged for serial transfer with an analog/digital converter.

FIG. 1 depicts an apparatus 10 in accord with the invention arranged for serial transfer with control device 12. The apparatus 10 can be a microprocessor or other general or special purpose digital data processing apparatus. In the illustrated embodiment, it comprises an embedded processor 14 that is implemented with gate array 15 or other applications specific integrated circuit (ASIC) to form inter alia a control system input/output module.

The control device 12 can comprise a field device, such as a sensor, servo, actuator, or other control device for use in process control, environmental control or other control-related applications. By way of further non-limiting example, the field device can be a flowmeter, pressure sensor, temperature sensor, level sensor, valve, recorder, positioner, or other such device, e.g., operating with outputs in the range of 4–20 mA or 1–5 V dc, or otherwise, per proprietary or industry protocol.

In the embodiment shown, the field device is coupled with interface logic, such as illustrated the analog-to-digital (A/D) converter, that transforms and/or conditions the field device output as required for communication with apparatus 10. Control devices comprising servos, actuators and other such field devices can alternatively, or in addition, include digital-to-analog (D/A) converters for conditioning communications received from apparatus 10. Those skilled in the art will, of course, appreciate that interface logic other than (or in addition to) A/D or D/A converters can also be used in order to transform and/or condition communications between the field device and the apparatus 10. Still further in this regard, it will be appreciated that the interface device can be, for example, a modem or other communications device designed to transmit and/or receive information with a remote field device (e.g., a sensor disposed in a thermal well or a pressure transducer mounted on a remote pipe.). Moreover, it will be appreciated that interface logic may be "built into" the field device directly, e.g., in the case of a field device that inputs and outputs digital signals directly.

In any event, apparatus 10 and device 12 are equipped with serial peripheral interfaces (SPIs) 16, 18, respectively. Per convention, these include at least data-in, data-out clock ports which are configured and operated per industry standards. Additional ports, both within and outside such standards may be provided as well. The respective ports are coupled to one another, as shown, via serial buses 20, which may be embodied in copper or other direct cabling, as well as in line-of-sight (e.g., infrared or microwave, radio frequency) or other such media.

In addition to processor 14, apparatus 10 includes a digital device interface 22 with first and second transfer logic sections 24, 26, as well as with register store 28. First transfer logic section transfers nibbles, bytes, word, long-words or other multi-bit datum, e.g., between the processor 14 and the A/D converter 12. This is done by bit-wise or serial application of multi-bit datum to SPI 16 for transfer to the SPI 18 and/or receiving from SPI 16 of a multi-bit datum bit-wise or serially transferred thereto by the SPI 18. In these regards, logic section 24 can be constructed and operated in the manner of a shift register engine of the type known in the art for transferring multi-bit datum over an SPI.

Thus, for example, section 22 can initiate transfer of a byte by asserting clocking signals on the clock line connecting the SPIs 16, 18. With each pulse, section 22 shifts a bit onto SPI 16's data out port for transfer to SPI 18's data in port. Within the same clock cycle, A/D converter 12 shifts a bit onto SPI 18's data out port for transfer to SPI 16's data in port. This process repeats eight times, thus transferring a byte in each direction. Transfer of nibbles, words, longwords and other multi-bit data are accomplished by using more or less cycles.

In preferred aspects, section 24 provides such capabilities in a manner specifically configured for operation in accord with the second transfer logic section 26. That section 26 effects a transfer transaction between the processor 14 and the A/D converter 12, that is, the transfer of plural multi-bit datum relating to a common data access operation or a common data generation operation. In the illustrated embodiment, the transaction is a "continuous read" operation, wherein section 26 causes A/D converter 12 to generate a stream of data, e.g., based on the readings from an attached sensor device (not shown), for transfer to apparatus 10. The transaction can also include, by way of non-limiting example, a "continuous write," wherein section 26 causes a stream of set points or other control data generated by processor 14 (or stored in its memory) to be serially output to device 12. This is, of course, of greater applicability for servos, actuators, and the like, rather than for A/D converters.

Section 26 effects a transfer transaction by invoking section 24 to transfer with A/D converter 12 (i) commands for initiating, e.g., a specific data collection operation, and (ii) data generated during that operation. Such a transaction requires no interventions by processor 14, apart from its signaling section 26 to begin the operation and/or its moving acquired data from the register stores 28 to processor 14 memory (not shown).

In this and the sections that follow, the second transfer logic section 26 is alternatively referred to as "state machine," "FSM," "SPI engine," and "SPI state machine," among others. The first transfer logic section 24 is referred to as the write_read engine or "wr_rd" engine.

Register store 28 maintains control information and data for serial transfers performed by digital device interface 22. The store 28 includes the items identified below, which can be stored in registers, a linked list, an array or other data structures:

| Register Name | Content/Description |
|---|---|
| COMMS IN: | A/D Communications Register. Data written into this register is sent out serially to the A/D converter 12 COMMS (or communications) register. |
| DATA READ | A/D Data Readout. Contains the status and configuration readout from the A/D converter 12. |
| DATA WRITE | A/D Data Write. Data written into this register is sent out serially to the A/D converter 12 for configuration. |
| ANALOG DATA | Analog Data. Contains the analog data readout of the A/D converter 12. Refer to CONFIG register. |
| CONFIGURATION | Contains the following flags, with the following meanings: Go. Write high to initiate second transfer logic section 26. The enable bit must be also set high. SPI Manual/Automatic. Write this bit high to operate the SPI engine manually. Write this bit low to operate in automatic mode. Idle. Write this bit high to stop the automatic reads. |
| STATUS | State. When high, next state will be the idle state. Done. When high, the SPI state machine has completed a manual read or write operation. |

Figure 2:
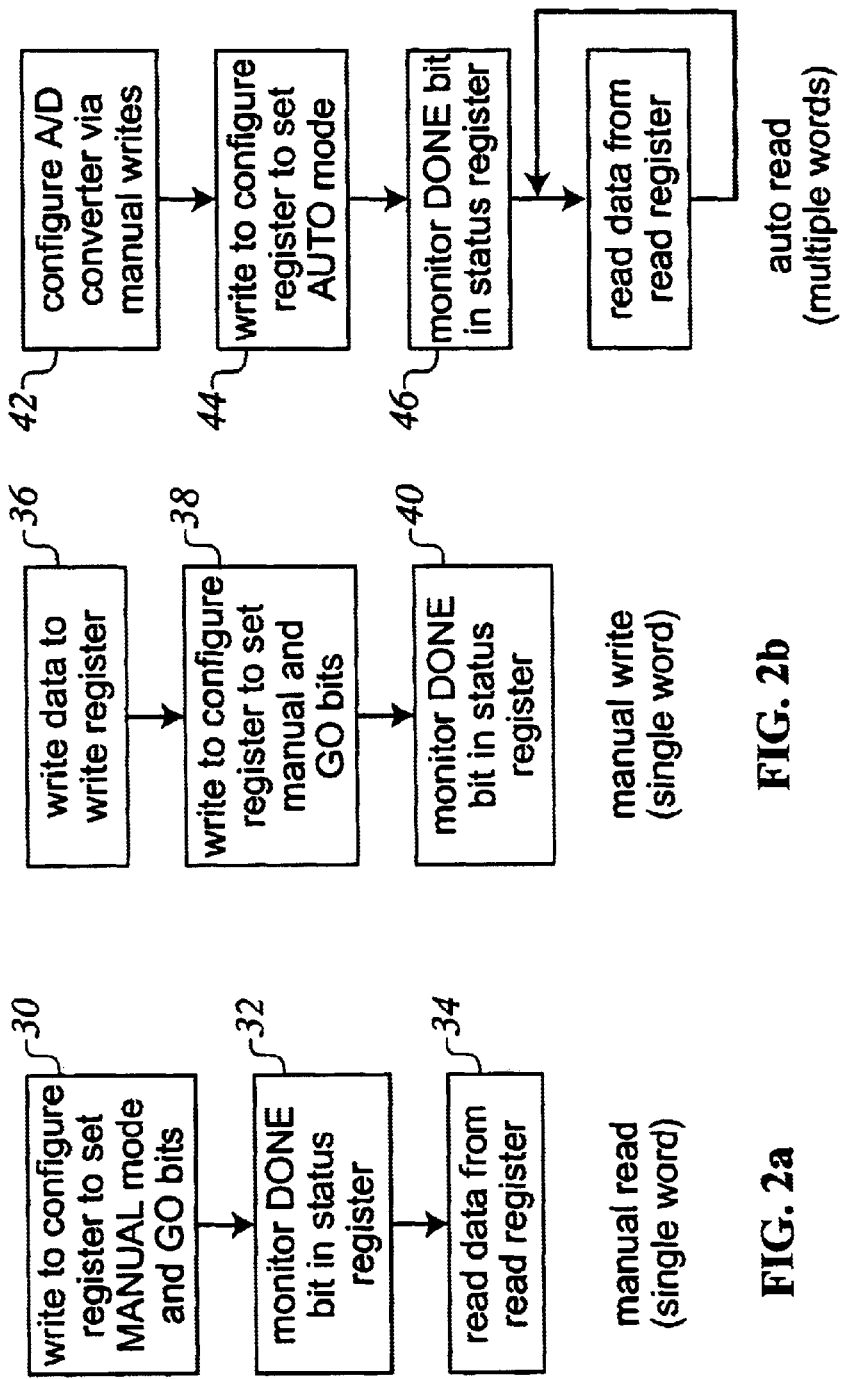
FIGS. 2A–2C depict a sequence of operations executed by a processor in order to effect a serial transfer using a digital device interface according to the invention.

A further appreciation of this may be attained by reference to FIGS. 2A–2C, showing a sequence of operations executed by a processor 14 in order to effect serial transfers with device 12 using digital device interface 22.

Referring to FIG. 2A, there is shown a sequence of transactions executed by a processor 14 in order to effect a single-word read of data from device 12. Here, the processor 14 writes to the configuration register to set the GO bit to initiate a serial read from the A/D converter 12 or other SPI-compatible device. See step 30. When the state machine 26 has completed the serial input operation it sets the done bit in the status register which can be used to interrupt the processor 14 or the processor 14 can read to determine that the operation is complete. See step 32. The processor 14 then reads the parallel data in the data read register. See step 36.

Referring to FIG. 2B, there is shown a sequence of transactions executed by a processor 14 in order to effect a single-word write of data from device 12. The microprocessor writes the data to be sent to the SPI device 12 into the data write register (see step 36) and then writes to a GO bit in the configuration register to start the state machine 26. The state machine 26 responds to the GO bit and performs the serial transfer. When the serial transfer is complete the state machine 26 sets the done bit in the status register which can be used to interrupt the microprocessor or the microprocessor can read to determine that the operation is complete.

Referring to FIG. 2C, there is shown a sequence of transactions executed by a processor 14 in order to effect a continuous read of data from device 12. In the illustrated embodiment, that device 12 is an Analog Devices AD7705 A/D converter, which requires that all communications to the device must start with a write to a communications register. The data written to this register determines whether the next operation to the device is a read or a write and also determines to which device register this read or write occurs. The sequence of writes and reads to obtain conversion data follows:

1) Calibrate the A/D converter 12 using single-word writes as described above. See step 42.
2) Set configuration register for continuous (or automatic) read mode. See step 44.
3) Monitor Done bit in configuration register, which is set by the state machine 26 to indicate when each new datum arrives from the device 12. Unload that data to the processor stores (not shown) and repeat. See step 46. Automatic reading is disabled by setting the Idle bit in the configuration register.

Figure 3:
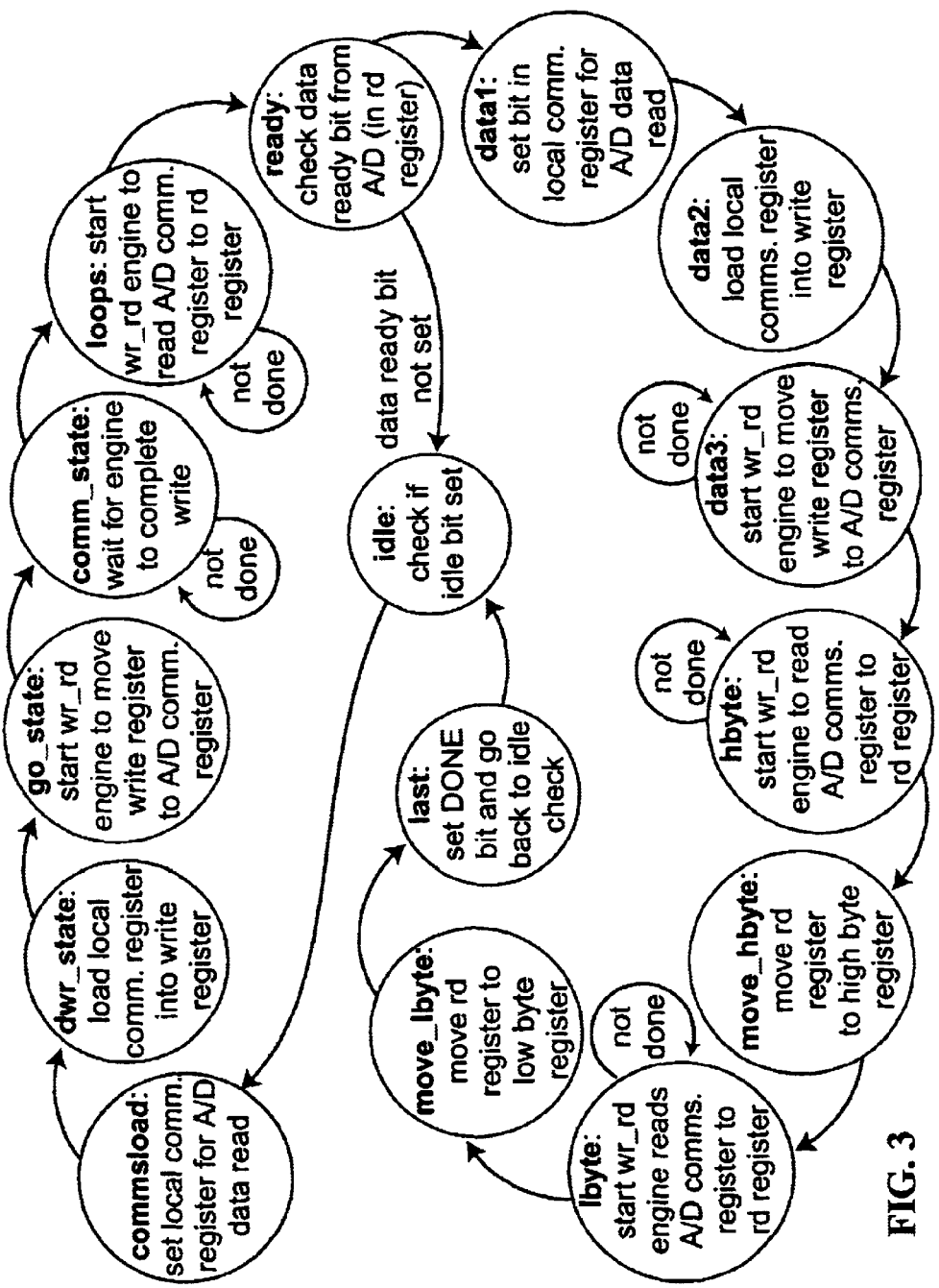
FIG. 3 depicts operation of a state machine in a digital device interface according to the invention.

Operation of the state machine 26 may be attained by reference to FIG. 3, which is explained more fully to the following code excerpts, which identify the machine states and resulting actions. Labels in the "bubbles" of FIG. 3 correspond to those in the case statements below.

```
BEGIN
case present_state is
    when idle =>                              -- Idle state . . . wait for
        if idle bit '0' then                  -- processor 14 to start
                                              -- state
            next_state <= commsload;          -- machine for 16 bit
        else                                  -- auto data read
            next_state <= idle;
        end if;
    when commsload =>                         -- set w/r bit of comms
        next_state <= dwr state;              -- register for next
                                              -- operation to be a
                                              -- read of the AD device
                                              -- 12
    when dwr_state =>                         -- put comms into dwr
        next_state <= go_state;               -- register of wr_rd
                                              -- engine
    when go_state =>                          -- kick off wr_rd engine
                                              -- 24
        next_state <= comms_state;            -- to have it write
                                              -- comms to AD device
                                              -- 12
    when comms_state =>                       -- wait for write to
        ifdone'EVENT AND done ='1' then       -- complete
            next_state <= loops;
        else
            next_state <= comms_state;
        end if;
    when loops =>                             -- write to comms is
        if done'EVENT AND done ='1' then      -- complete so hit go bit
            next_state <= ready;              -- to tell wr_rd engine
                                              -- 24
        else                                  -- to read comms back
            next_state <= loops;              -- from AD device 12
        end if;
    when ready =>                             -- drd now contains
                                              -- comms
                                              -- reg from AD device
                                              -- 12,
        if drd(7) = '0' then                  -- examine drdy bit to see
            next_state <= data1;              -- ifdata can be read
        else                                  -- from AD device 12
            next_state <= idle;               -- if DRDY bit is low,
                                              -- we have data!
        endif;                                -- else we have to
                                              -- write/read
                                              -- idle again
    when data1 =>                             -- set reg. sel. bits
        next_state <= data2;                  -- of comms
                                              -- to tell AD device
                                              -- 12
                                              -- next operation
                                              -- will be a read of data
    when data2 =>                             -- move comms to dwr
        next_state <= data3;                  -- register of wr_rd
                                              -- engine 24
    when data 3 =>                            -- tell wr_rd engine
                                              -- 24 to
        if done'EVENT AND done ='1' then      -- write comms to AD
                                              -- device 12
            next_state <= hbyte;
        else
            next_state <= data3;
        end if;
    when hbyte =>                             -- tell wr_rd engine
                                              -- 24 to
        ifdone'EVENT AND done = '1' then      -- read high byte of data
            next_state <= move_hbyte;
        else
            next_state <= hbyte;
        end if;
    when move_hbyte =>                        -- move high byte to
        next_state <=lbyte;                   -- hdata register
    when lbyte =>                             -- tell wr_rd engine
                                              -- 24 to
        if done'EVENT AND done = '1' then     -- read low byte of data
            next-state <= move_lbyte;
        else
            next_state <= lbyte;
        endif;
    when move_lbyte =>                        -- move low byte of data
        next_state <= last;                   -- to ldata, go to last
                                              -- state.
    when last =>                              -- go back to checking
                                              -- for
        next_state <= idle;                   -- idle state
    when others => null;                      -- catch for all illegal
                                              -- states
end case;
```

In the preceding code excerpts, it will be appreciated that in the "ready" state, the state machine 26 continually polls the drd(7) bit of the device 12 comms register. That bit identifies whether the device 12 has new data to send to apparatus 10. The state machine 26 loops until the bit is set, at which time it proceeds to the "data1" state, where it commands the device 12 to output the new data. Those skilled in the art will, of course, appreciate that other techniques may be applied in order to determine when device 12 is ready to send data, as well as to condition it to output that data.

Figure 4:
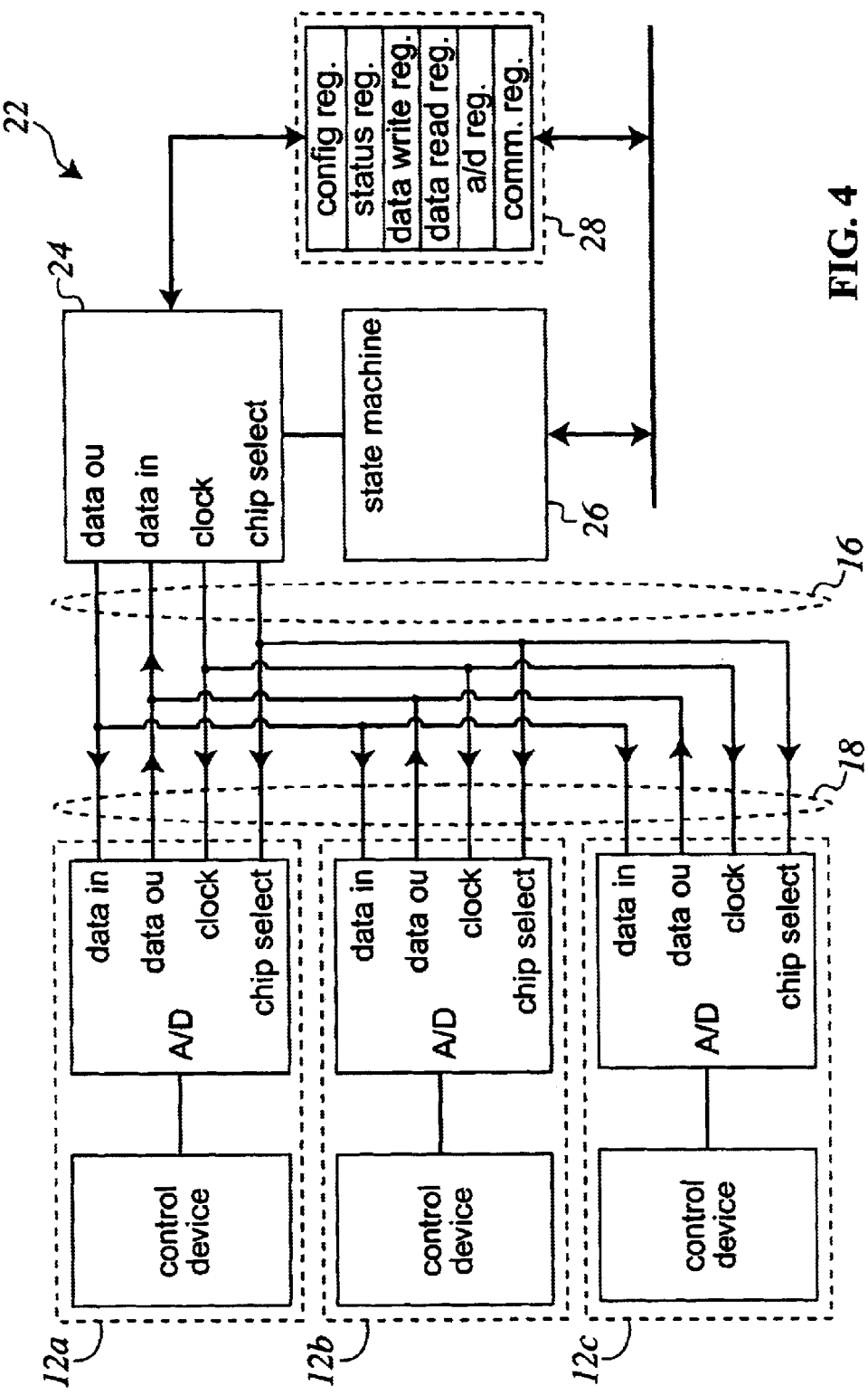
FIG. 4 depicts a digital device interface according to the invention for communication with multiple control devices.

FIG. 4 depicts a digital device interface 22 according to the invention for facilitating communication between a processor (not shown) and multiple control devices SPI-compatible control devices 12a–12c. The interface 24 operates as described, except insofar as it includes additional chip select logic for specifying communications with one or more of the devices 12a–12c at a time.

A further understanding of the operation of illustrated interface 24 may be attained by reference to the following simulation code excerpts:

```
================================================
-- File: aio_top.VHD
-- top level file for asic field analog input/output design
-- ================================================
    LIBRARY ieee;
    USE ieee.std_logic_1164.all;
    ENTITY aio_top IS
    PORT        (
    clk          : IN          std_logic;
    reset        : IN          std_logic;
    -- Address/Data bus interface pins
    srdy         : OUT         std_logic;
    rd_en        : OUT         std_logic;
    cs_n         : IN          std_logic;
    wr_n         : IN          std_logic;
    rd_n         : IN          std_logic;
    Adrs         : IN          std_logic_vector (8 downto 1);
    di           : IN          std_logic_vector (15 DOWNTO 0);
    do           : OUT         std_logic_vector (15 DOWNTO 0);
    -- Port pins unique to each spi channel
    15
    din1         : IN          std_logic;
    dout1        : OUT         std_logic;
```

```
            sclk1       : OUT       std_logic;
            din2        : IN        std_logic;
            dout2       : OUT       std_logic;
            sclk2       : OUT       std_logic;
            dout3       : IN        std_logic;
            sclk3       : OUT       std_logic;
            din4        : CUT       std_logic;
            dout4       : IN        std_logic;
            sclk4       : OUT       std_logic;
            din5        : OUT       std_logic;
            dout5       : IN        std_logic;
            sclk5       : OUT       std_logic;
            );          : OUT       std_logic
END aio_top;
ARCHITECTURE behavior OF aio_top IS
COMPONENT spi_top
PORT (
            clk         : IN        std_logic;
            reset       : IN        std_logic;
            sclk        : OUT       std_logic;
            din         : IN        std_logic;
            dout        : OUT       std_logic;
            comms_out   : OUT       std_logic_vector (7 DOWNTO 0);
-- for debug
            spi_clk     : IN        std_logic;
-- spi_top Address/Data bus interface pins
            ready       : OUT       std_logic;
            cs          : IN        std_logic;
            wr          : IN        std_logic;
            rd          : IN        std_logic;
            Adrs        : IN        std_logic_vector (4 downto 1);
            Port_in     : IN        std_logic_vector (15 downto 0);
            Port_out    : OUT       std_logic_vector (15 downto 0)
            );
END COMPONENT;
-- signals common to all spi_top instances
            SIGNAL   spi_clk      : std_logic;
            SIGNAL   Address      : std_logic_vector (7 DOWNTO 1);
-- signals unique for each spi_top instances
            SIGNAL   ready1       : std_logic;
            SIGNAL   Port_in1     : std_logic_vector (15 DOWNTO 0);
            SIGNAL   Port_out1    : std_logic_vector (15 DOWNTO 0)
            SIGNAL   cs1_n        : std_logic;
            SIGNAL   ready2       : std_logic;
            SIGNAL   Port_in2     : std_logic_vector (15 DOWNTO 0);
            SIGNAL   Port_out2    : std_logic_vector (15 DOWNTO 0);
            SIGNAL   cs2_n        : std_logic;
            SIGNAL   ready3       : std_logic;
            SIGNAL   Port_in3     : std_logic_vector (15 DOWNTO 0)
            SIGNAL   Port_out3    : std_logic_vector (15 DOWNTO 0)
            SIGNAL   cs3_n        : std_logic;
            SIGNAL   ready4       : std_logic;
            SIGNAL   Port_in4     : std_logic_vector (15 DOWNTO 0);
            SIGNAL   Port_out4    : std_logic_vector (15 DOWNTO 0);
            SIGNAL   cs4_n        : std_logic;
            SIGNAL   ready5       : std_logic;
            SIGNAL   Port_in5     : std_logic_vector (15 DOWNTO 0);
            SIGNAL   Port_out5    : std_logic_vector (15 DOWNTO 0)
            SIGNAL   cs5_n        : std_logic;
BEGIN
spi_top_1:  spi_top PORT MAP (
            clk         => clk,
            reset       => reset,
            spi_clk     => spi_clk,
            wr          => wr_n,
            rd          => rd_n,
            Adrs        => Address (4 DOWNTO 1),
            din         => din1,
            dout        => dout1,
            sclk        => sclk1,
            ready       => ready1,
            Port_in     => Port_in1,
            Port_out    => Port_out1,
            cs          => cs1_n
            );
spi_top_2:  spi_top PORT MAP (
            clk         =>clk,
            reset       => reset,
            spi_clk     => spi_clk,
            wr          => wr_n,
            rd          =>rd_n,
            Adrs        => Address (4 DOWNTO 1),
            din         => din2,
            dout        => dout2,
            sclk        => sclk2,
            ready       => ready2,
            Port_in     => Port_in2,
            Port_out    => Port_out2,
            cs          => cs2_n
            );
spi_top_3:  spi_top PORT MAP (
            clk         =>clk,
            reset       => reset,
            spi_clk     => spi_clk,
            wr          => wr_n,
            rd          =>rd_n,
            Adrs        => Address (4 DOWNTO 1),
            din         => din3,
            dout        => dout3,
            sclk        => sclk3,
            ready       => ready3,
            Port_in     => Port_in3,
            Port_out    => Port_out3,
            cs          => cs3_n
            );
spi_top_4:  spi_top PORT MAP (
            clk         =>clk,
            reset       => reset,
            spi_clk     => spi_clk,
            wr          => wr_n,
            rd          =>rd_n,
            Adrs        => Address (4 DOWNTO 1),
            din         => din4,
            dout        => dout4,
            sclk        => sclk4,
            ready       => ready4,
            Port_in     => Port_in4,
            Port_out    => Port_out4,
            cs          => cs4_n
            );
spi_top_5:  spi_top PORT MAP (
            clk         =>clk,
            reset       => reset,
            spi_clk     => spi_clk,
            wr          => wr_n,
            rd          =>rd_n,
            Adrs        => Address (4 DOWNTO 1),
            din         => din5,
            dout        => dout5,
            sclk        => sclk5,
            ready       => ready5,
            Port_in     => Port_in5,
            Port_out    => Port_out5,
            cs          => cs5_n
            );
ai_ao_proc: PROCESS
(clk,reset,ready1,ready2,ready3,ready4,ready5,wr_n,rd_n,cs_n
)
BEGIN
    srdy    <= (ready1 OR ready2 OR ready3 OR ready4 OR ready5); -- or syncronous rea
    rd_en   <= NOT (cs_n AND rd_n) ;
-- Jorge's rd_en sig
    IF reset = '1' THEN
        NULL;
ELSEIF clk'EVENT AND clk = '1' THEN
END IF;
    -- address decoder
    IF (cs n = '0') THEN
        CASE address (7 DOWNTO 5) IS
WHEN "000"      =>
            cs1_n <= '0' ;
            selected spi_top
            cs2_n <= '1';
            cs3_n <= '1';
            cs4_n <= '1';
            cs5_n <= '1';
            IF wr_n = '0' THEN
```

```
                    do      <= Port_out1;
                END IF;
                IF rd_n ='0' THEN
                    Port_in1 <= di;
                    Port_in2 <= "0000000000000000";
                    Port_in3 <= "0000000000000000";
                    Port_in4 <= "0000000000000000";
                    Port_in5 <= "0000000000000000";
                END IF;
WHEN "001"      =>
                cs1_n <= '1';
                selected spi_top
                cs2_n <= '0';
                cs3_n <= '1';
                cs4_n <= '1';
                cs5_n <= '1';
                IF wr_n = '0' THEN
                    do      <= Port_out2;
                END IF;
                IF rd_n = '0' THEN
                    Port_in2 <= di;
                    Port_in1 <= "0000000000000000";
                    Port_in3 <= "0000000000000000";
                    Port_in4 <= "0000000000000000";
                    Port_in5 <= "0000000000000000";
                END IF;
WHEN "010"      =>
                cs1_n <= '1';
                selected spi_top
                cs2_n <= '1';
                cs3_n <= '0';
                cs4_n <= '1';
                cs5_n <= '1';
                IF wr_n = '0' THEN
                    do      <= Port_out3;
                END IF;
                IF rd_n = '0' THEN
                    Port_in3 <= di;
                    Port_in1 <= "0000000000000000";
                    Port_in2 <= "0000000000000000";
                    Port_in4 <= "0000000000000000";
                    Port_in5 <= "0000000000000000";
                END IF;
WHEN "011"      =>
                cs1_n <= '1';
                selected spi_top
                cs2_n <= '1';
                cs3_n <= '1';
                cs4_n <= '0';
                cs5_n <= '1';
                IF wr_n = '0' THEN
                    do      <= Port_out4;
                END IF;
                IF rd_n = '0' THEN
                    Port_in4 <= di;
                    Port_in1 <= "0000000000000000";
                    Port_in2 <= "0000000000000000";
                    Port_in3 <= "0000000000000000";
                    Port_in5 <= "0000000000000000";
                END IF;
WHEN "100"      =>
                cs1_n <= '1';
                selected spi_top
                cs2_n <= '1';
                cs3_n <= '1';
                cs4_n <= '1';
                cs5_n <= '0';
                IF wr_n = '0' THEN
                    do      <= Port_out5;
                END IF;
                IF rd_n = '0' THEN
                    Port_in5 <= di;
                    Port_in1 <= "0000000000000000";
                    Port_in2 <= "0000000000000000";
                    Port_in3 <= "0000000000000000";
                    Port_in4 <= "0000000000000000";
                END IF;
WHEN OTHERS     =>
                cs1_n <= '1';
                selected none ! !
                cs2_n <= '1';
                cs3_n <= '1';
                cs4_n <= '1';
                cs5_n <= '1';
                Port_in1 <= "0000000000000000";
                Port_in2 <= "0000000000000000";
                Port_in3 <= "0000000000000000";
                Port_in4 <= "0000000000000000";
                Port_in5 <= "0000000000000000";
            END CASE;
        ELSE
                cs1_n <= '1';
        deselected all
                cs2_n <= '1'
                cs3_n <= '1'
                cs4_n <= '1'
                cs5_n <= '1'
                Port_in1 <= "0000000000000000";
                Port_in2 <= "0000000000000000";
                Port_in3 <= "0000000000000000";
                Port_in4 <= "0000000000000000";
                Port_in5 <= "0000000000000000";
        END IF;
END PROCESS;
END behavior;
-- ==================================================
-- File: spi_top.VHD
-- SERIAL INTERFACE SPI TOP LEVEL FOR AD7705 A-D Converter
-- ==================================================
    LIBRARY ieee;
    USE ieee.std_logic_1164.all;
    entity spi_top is
    port(
    clk             : IN    std_logic;
    reset           : IN    std_logic;
    sclk            : OUT   std_logic;
    din             : IN    std_logic;
    dout            : OUT   std_logic;
    spi2_clk        : IN    std_logic;
    spiclken        : IN    std_logic;
-- Address/Data bus interface pins
    ready           : OUT   std_logic;
    cs              : IN    std_logic;
    wr              : IN    std_logic;
    Adrs            : IN    std_logic_vector(4 downto 1);
    Port_inn        : IN    std_logic_vector(15 downto 0);
    Port_out        : OUT   std_logic_vector(15 downto 0)
    );
end spi_top;
---------------------------------------------------------------
-- top level file for spi design
---------------------------------------------------------------
ARCHITECTURE behavior OF spi_top IS
COMPONENT wr_rd_out
    PORT (
    clk             : IN    std_logic;
    clk_idle        : IN    std_logic;
    22
    reset           : IN    std_logic;
    enable          : IN    std_logic;
    go              : IN    std_logic;
    din             : IN    std_logic;
    dwr             : IN    std_logic_vector(7 DOWNTO 0);
    sclk            : OUT   std_logic;
    done            : OUT   std_logic;
    dout            : OUT   std_logic;
    drd             : OUT   std_logic_vector(7 DOWNTO 0)
    );
END COMPONENT;
COMPONENT spi_fsm
    PORT (
    comms_in        : IN    std_logic_vector(7 DOWNTO 0);
    ldata           : OUT   std_logic_vector(7 DOWNTO 0);
    hdata           : OUT   std_logic_vector(7 DOWNTO 0);
    dwr             : OUT   std_logic_vector(7 DOWNTO 0);
    drd             : IN    std_logic_vector(7 DOWNTO 0);
    go              : OUT   std_logic;
    reset           : IN    std_logic;
```

```
            idlehd —bit    : IN       std_logic;
            done           : IN       std_logic;
            clk            : IN       std_logic;
            state_bit      : OUT      std_logic;
            in_idle        : OUT      std_logic;
            presrdy        : OUT      std_logic;
            load_data      : OUT      std_logic;
            en_zero        : IN       std_logic;
            en_one         : IN       std_logic;
            error_pulse    : OUT      std_logic;
            SPI—error      : IN       std_logic
        );
END COMPONENT;
        SIGNAL drd              : std_logic_vector(7 DOWNTO 0);
        SIGNAL idle_bit         : std_logic;
        SIGNAL go               : std_logic;
        SIGNAL done             : std_logic;
        SIGNAL state_bit        : std_logic;
        SIGNAL in_idle          : std_logic;
        SIGNAL dwr              : std_logic_vector(7 DOWNTO 0);
        SIGNAL AD_data          : std_logic_vector(15 DOWNTO 0);
        SIGNAL Dwr_1            : std_logic_vector(7 DOWNTO 0);
        SIGNAL Dwr_2            : std_logic_vector(7 DOWNTO 0);
        SIGNAL go_1             : std_logic;
        SIGNAL go_2             : std_logic;
        SIGNAL comms_in         : std_logic_vector(7 DOWNTO 0);
        SIGNAL ldata            : std_logic_vector(7 DOWNTO 0);
        SIGNAL hdata            : std_logic_vector(7 DOWNTO 0);
        SIGNAL SPI_FSM_en       : std_logic;
        SIGNAL load_data        : std_logic;
        SIGNAL clk_idle         : std_logic;
        SIGNAL clk_edge         : std_logic;
        SIGNAL presrdy          : std_logic;
        SIGNAL oktoread         : std_logic;
        SIGNAL cswr             : std_logic;
        SIGNAL zero_bit         : std_logic;
        SIGNAL error_pulse:     : std_logic;
        SIGNAL SPI_error        : std_logic;
BEGIN
        spi_fsm1: spi_fsm PORT MAP (
        comms_in            => comms_in,
        ldata               => ldata,
        hdata               => hdata,
        dwr                 => dwr_1,
        drd                 => drd,
        go                  => go_1,
        reset               => reset,
        idle_bit            => idle_bit,
        done                => done,
        clk                 => clk,
        state_bit => state_bit,
        in_idle             => in idle,
        presrdy             => presrdy,
        load_data           => load_data,
        en_zero             => zero bit,      -- mode bit 0
        en_one              => SPI FSM en,    -- mode bit 1
error_13 pulse              => error_pulse,
        SPI error           => SPI error
        )
    wr_rd:wr_rd_out PORT MAP (
        clk                 => spi2_clk,
        clk_idle            => clk_idle,
        reset               => reset,
        enable              => spiclken,
        go                  => go,
        din                 => din,
        dwr                 => dwr,
        sclk                => sclk,
        done                => done,
        dout                => dout,
        drd                 => drd
);
output_mux: PROCESS
(Adrs,comms_in,Dwr,Drd,AD_data,SPI_FSM_en,
        state_bit,in_idle,
        clk_idle,clk_edge,idle_bit,go,done,
        oktoread, SPI_error, zero_bit)
        --outputs: Port_out
BEGIN
    CASE Adrs IS
        WHEN "0000" =>    Port_out(7 DOWNTO 0)    <= comms_in;
                          Port_out(15 DOWNTO 8)   <= (OTHERS => '0');
        WHEN "0001"=>     Port_out(7 DOWNTO 0)    <= Dwr;
                          Port_out(15 DOWNTO 8)   <= Drd;
        WHEN "0010" =>    Port_out                <= AD_data
        WHEN "0011" =>    Port_out(0)             <= zero_bit;
                          Port_out(1)             <= SPI_FSM_en;
                          Port_out(2)             <= clk_idle;
                          Port_out(3)             <= clk_edge;
                          Port_out(4)             <= idle_bit;
                          Port_out(5)             <= '0';
                          Port_out(6)             <= go;
                          Port_out(7)             <= '0';
                          Port_out(8)             <= done;
                          Port_out(9)             <= state_bit;
                          Port_out(10)            <= oktoread;
                          Port_out(11)            <= in_idle;
                          Port_out(14 DOWNTO      <= (OTHERS
                          12)
                          =>'0');
                          Port_out(15)            <= SPI_error;
-- error from spi_fsm statemachine
        WHEN OTHERS =>    Port_out                <= (OTHERS =>'0');
        END CASE;
END PROCESS;
input_mux: PROCESS (reset,cswr,Adrs,Port_in)
        --output: SPI_FSM_en,clk_idle,clk_edge,idle_bit
BEGIN
    IF reset = '1' THEN
        comms_in     <= (OTHERS =>'0');
        zero_bit     <= '0';
        clk_idle     <= '1';
        clk_edge     <= '1';
        idle_bit     <= '1';
        Dwr_2        <= (OTHERS => '0');
    ELSIF cswr = '1' THEN
        CASE Adrs IS
            WHEN "0000" => comms_in(7 downto 0)   <= Port_in(7 downto 0);
            WHEN "0001" => Dwr_2                  <= Port_in(7 downto 0);
            WHEN "0011" => zero_bit               <= Port_in(0);
                           SPI_FSM_en             <= Port_in(1);
                           clk_idle               <= Port_in(2);
            clk_edge                              <= Port_in(3);
            idle_bit                              <= Port_in(4);
            WHEN others => null;
            END CASE;
    END IF;
END PROCESS;
fsm_mux: PROCESS (reset, clk) --output: go,Dwr
BEGIN
    IF reset = '1' THEN
        go <= '0';
    ELSIF clk'EVENT AND clk ='1' THEN
        IF SPI_FSM en='0' THEN
            go <= go_2;
        ELSE
            go <= go_1;
        END IF;
    END IF;
END PROCESS;
fsm_mux_dwr: PROCESS(SPI_FSM_en, Dwr_1, Dwr_2)
BEGIN
    IF SPI_FSM en='0' THEN
        Dwr <= Dwr_2;
    ELSE
        Dwr <= Dwr_1;
    END IF;
END PROCESS;
data_latch: PROCESS (reset, load data, hdata, ldata)
    --output:AD_data
BEGIN
    IF reset = '1' THEN
        AD_data <= (OTHERS => '0');
    ELSEIF load_data = '1' THEN
        AD_data (15 DOWNTO 8) <= hdata (7 DOWNTO 0);
        AD_data (7 DOWNTO 0) <= ldata (7 DOWNTO 0);
```

-continued

```
        END IF;
END PROCESS;
okread_proc: PROCESS(reset, load data, cswr, adrs, port_in)
BEGIN
        IF reset = '1' THEN
                oktoread <= '0';
        ELSIF load_data = '1' THEN
                oktoread <= '1';
        ELSIF cswr = 1' AND Adrs = "0011" THEN
                oktoread <= port_in(10);
        END IF;
END PROCESS okread_proc;
go2_proc: PROCESS(clk, reset)
BEGIN
IF reset = '1' THEN
        go_2 <= '0';
ELSEIF clk'EVENT AND clk = '1' THEN
        IF port_in(6) = '1' AND (adrs = "0011") AND (cswr = '1')
        THEN
                go_2 <= '1';
        ELSE
                go_2 <= '0';
        END IF;
END IF;
END PROCESS go2_proc;
srdy_proc: PROCESS(reset, clk)
BEGIN
        IF reset = '1' THEN
                ready <= '1';
        ELSIF clk'EVENT AND clk = '1' THEN
                IF adrs = "0010" AND cs = '0' AND presrdy = '1' THEN
                        ready <= '0';
                ELSE
                        ready <= '1';
                END IF;
        END IF;
END PROCESS srdy_proc;
cswr 21 = NOT (cs OR wr);
SPI_error_proc: PROCESS(reset, error_pulse, cswr, adrs,
port_in)
BEGIN
        IF reset = '1' THEN
                SPI_error <= '0';
        ELSEIF error_pulse = '1' THEN
                SPI_error <= '1';
        ELSEIF cswr = '1' AND Adrs = "0011" THEN
                SPI_error <= port_in(15);
        END IF;
END PROCESS SPI_error_proc;
END behavior;
-- ==================================================
-- File: spi_fsm.VHD
-- ==================================================
LIBRARY ieee;
USE ieee.std_logic_1164.all;
ENTITY spi_fsm IS
        PORT(
                comms_in    : IN     std_logic_vector(7 DOWNTO 0);
                ldata       : OUT    std_logic_vector(7 DOWNTO 0);
                hdata       : OUT    std_logic_vector(7 DOWNTO 0);
                dwr         : OUT    std_logic_vector(7 DOWNTO 0),
                drd         : IN     std_logic_vector(7 DOWNTO 0);
                go          : OUT    std_logic;
                reset       : IN     std_logic;
                idle_bit    : IN     std_logic;
                done        : IN     std_logic;
                clk         : IN     std_logic;
                state_bit   : OUT    std_logic;
                in_idle     : OUT    std_logic;
                presrdy     : OUT    std_logic;
                load_data   : OUT    std_logic;
                en_zero     : IN     std_logic;
                en_one      : IN     std_logic;
                error_pulse : OUT    std_logic;
                SPI_error   : IN     std_logic
        );
END spi_fsm;
ARCHITECTURE behavior OF spi_fsm IS
TYPE StateType IS (idle,check_mode,error_state, check_error,
        commsload,dwr_state,go_state,comms_state,
        wait_for_done1,loops,wait_for_done2,ready,
        data1,data3, wait_for_done3, hbyte,
        wait_for_done4,move_hbyte,lbyte,
        wait_for_done5,move_1byte,last);
SIGNAL present_state,next_state : StateType;
SIGNAL comms_loc : std_logic_vector(7 DOWNTO 0);
BEGIN -- start of architecture
state_proc:PROCESS(reset, clk)
BEGIN
IF reset = '1' THEN
        state_bit <= '0';
ELSIF clk'EVENT AND clk = '1' THEN
        IF next_state = wait_for_done5 AND present_state /=
        wait_for_done5 THEN
                state_bit <= '1';
        ELSIF next_state = idle AND present_state /= idle THEN
                state_bit <= '0';
        END IF;
END IF;
END PROCESS;
idlestat_proc:PROCESS(reset, clk)
BEGIN
IF reset = '1' THEN
        in_idle <= '0';
ELSIF clk'EVENT AND clk = '1' THEN
        IF next_state = idle THEN
                in_idle <= '1';
        ELSE
                in_idle <= '0';
        END IF;
END IF;
END PROCESS;
one_shot: PROCESS (reset, clk) -- outputs: go
BEGIN
        IF reset = '1' THEN
                go <= '0';
        ELSIF clk'EVENT AND clk='1' THEN
                IF (next_state = go_state AND present_state /= go_state)
                OR
                (next_state = loops AND present_state /= loops) OR
                (next_state = data3 AND present_state /= data3) OR
                (next_state = hbyte AND present_state /= hbyte) OR
                (next_state = lbyte AND present_state /= lbyte) THEN
                        go <= '1';
                ELSE go <= '0';
                END IF;
        END IF;
END PROCESS;
data_shot: PROCESS (reset, clk) -- outputs: load_data
BEGIN
        IF reset = '1' THEN
                load_data <= '0';
        ELSIF clk'EVENT AND clk='1' THEN
                IF (next_state = last AND present_state /= last) THEN
                        load_data <= '1';
                ELSE load_data <= '0';
                END IF;
        END IF;
END PROCESS;
comms_move: PROCESS (reset, clk) -- outputs: comms_loc,dwr
BEGIN
        IF reset = '1' THEN
                comms_loc <= (others => '0');
                dwr <= (OTHERS =>'0');
        ELSIF clk'EVENT AND clk='1' THEN
                IF (next_state = commsload AND present_state /=
                        commsload) THEN
                        comms_loc <= comms_in;
                ELSIF (next_state = dwr_state AND present_state /=
                        dwr_state) THEN
                        dwr <= comms_loc OR "00001000";
                ELSIF (next_state = data1 AND present_state /= data1)
                THEN
                        dwr <= comms_loc OR "00111000";
                END IF;
        END IF;
END PROCESS;
spi_fsm_proc: PROCESS (reset, clk) -- outputs: present_state
```

```
BEGIN
    IF reset = '1' THEN
        present_state <= idle;
    ELSIF clk'event and clk = '1' then
present_state <= next_state;
    END IF;
END process spi_fsm_proc;
spi_fsm_machine: process
(present_state,idle_bit,done,drd(7)
                en_zero,en_one, SPI_error) -- outputs:next_state
BEGIN
    CASE present_state IS
        WHEN idle =>                    -- Idle state . . . wait for
            IF idle_bit = '0' THEN      -- V186 to start state
                next_state <=           -- machine for 16 bit
                check_mode;
            ELSE                        -- auto data read
                next_state <= idle;
            END IF;
        WHEN check_mode =>              -- check mode bits
            IF (en_zero = '0')AND
                (en_one = '1')          -- if state machine has
                THEN
                                        -- control
                next_state <=           -- of wr_rd machine then
                check_error;
                                        -- proceed to check for
            ELSE                        -- previous error
                                        -- otherwise declare
                                        -- error and
                next_state <= error_    -- goto to error state
                state;
            END IF;                     -- (then to idle state
                                        -- from error state)
        WHEN error_state =>             -- state to pulse error_pulse
                                        -- bit
            next_state <= idle;
        WHEN check_error =>             -- check if error bit has
                                        -- been set
            IF (SPI_error = '1') THEN   -- already . . . if it has,
                                        -- then
                next_state <= idle;     -- go back to idle
                                        -- otherwise run
            ELSE
                next_state <= commsload;
            END IF;
        WHEN commsload =>               -- set w/r bit of comms
            next_state <= dwr_state;    -- register for next
                                        -- operation to be a
                                        -- read of the AD
        WHEN dwr_state =>               -- put comms into dwr
            next_state <= go_state;     -- register of wr_rd
                                        -- engine
        WHEN go_state =>                -- kick off wr_rd engine
            next_state <= comms_state;  -- to have it write
-- comms to AD
        WHEN comms_state =>             -- wait for write to
                                        -- complete
            IF ( done ='0') THEN
                next_state <= wait_for_done1;
            ELSE
                next_state <= comms_state;
            END IF;
        WHEN wait_for_done 1 =>
            IF (done = '1') THEN
                next_state <= loops;
            ELSE
                next_state <= wait_for_done1;
            END IF;
        WHEN loops =>                   -- write to comms is
                                        -- complete so hit go
                                        -- bit
            IF done = '0' THEN          -- to tell wr_rd engine
                next_state <= wait_     -- to read comms back
                for_done2;
            ELSE                        -- from AD
                next_state <= loops;
            END IF;
        WHEN wait_for_done2 =>
            IF (done = '1') THEN
                next_state <= ready;
            ELSE
                next_state <= wait_for_done2;
            END IF;
        WHEN ready =>                   -- drd now contains comms
                                        -- reg from AD,
            IF drd(7) = '0' THEN        -- examine drdy bit to see
                next_state <= data1;    -- if data can be read
            ELSE                        -- from AD
                next_state <= idle;     -- if drdy bit is low we
                                        -- have data!
            END IF;                     -- else we have to
                                        -- write/read
                                        -- idle again
        WHEN data1 =>                   -- set reg. sel. bits
            next_state <= data3;        -- of comms
                                        -- to tell AD next engine
        WHEN data3 =>                   -- tell wr_rd engine to
            IF done = '0' THEN          -- write comms to AD
                next_state <= wait_for done3;
            ELSE
                next_state <= data3;
            END IF;
        WHEN wait_for_done3 =>
            IF (done = '1') THEN
                next_state <= hbyte;
            ELSE
                next_state <= wait_for_done3;
            END IF;
        WHEN hbyte =>                   -- tell wr_rd engine to
            IF done ='0' THEN           -- read high byte of data
                next_state <= wait_for done4;
            ELSE
                next_state <= hbyte;
            END IF;
        WHEN wait_for_done4 =>
            IF (done = '1') THEN
                next_state <= move_hbyte;
            ELSE
                next_state <= wait_for_done4;
            END IF;
        WHEN move_hbyte =>              -- move high byte to
            next_state <=lbyte;         -- hdata register
        WHEN lbyte =>                   -- tell wr_rd engine to
            IF done ='0' THEN           -- read low byte of data
                next_state <= wait_for_done5;
            ELSE
                next_state <= lbyte;
            END IF;
        WHEN wait_for_done5 =>
            IF (done = '1') THEN
                next_state <= move_lbyte;
            ELSE
                next_state <= wait_for_done 5;
            END IF;
        WHEN move_lbyte =>              -- move low byte of data
            next_state <= last;         -- to ldata, go to last
-- state.
        WHEN last =>
            next_state <= idle;         -- go back to checking for
                                        -- idle state
        WHEN others =>null;             -- catch for all illegal
                                        -- states
    END CASE;
END process spi_fsm_machine;
comb_process: PROCESS (reset, clk) -- outputs: hdata,ldata
BEGIN
    IF reset = '1' THEN
        hdata <= (others => '0');
        ldata <= (others => '0');
    ELSIF clk'EVENT AND clk='1' THEN
        IF (next_state = move_hbyte AND present_state /=
        move_hbyte) THEN
            hdata <= drd;
        ELSIF (next_state = move_lbyte AND present_state /=
        move_lbyte) THEN
            ldata <= drd;
        END IF;
```

```
        END IF
END process comb_process;
presrdy <= '1' WHEN next_state = move_lbyte ELSE '0';
error_shot: PROCESS (reset, clk) -- outputs: error_pulse
BEGIN
        IF reset = '1' THEN
                error_pulse <= '0';
        ELSIF clk'EVENT AND clk='1' THEN
                IF (next_state = error_state AND present_state /=
                error_state) THEN
                        error_pulse <= '1';
                ELSE error_pulse <= '0';
                END IF;
        END IF;
END PROCESS;
END behavior;
-- ==================================================
-- File: wrrd_out.VHD
-- NEW SERIAL INTERFACE SPI FOR MAX535 D to A Converter and
-- AD7705 A to D Converter
-- ==================================================
LIBRARY ieee;
use ieee.numeric_std.all;
use ieee.std_logic_1164.ALL;
ENTITY wr_rd_out IS PORT (
    clk         : IN    std_logic;
    clk_idle    : IN    std_logic;
    reset       : IN    std_logic;
    enable      : IN    std_logic;
    go          : IN    std_logic;
    din         : IN    std_logic;
    dwr         : IN    std_logic_vector(7 DOWNTO 0);
    sclk        : OUT   std_logic;
    done        : OUT   std_logic;
    dout        : OUT   std_logic;
    drd         : OUT   std_logic_vector(7 DOWNTO 0)
);
END wr_rd_out;
ARCHITECTURE behavior OF wr_rd_out IS
SIGNAL sclken       : std_logic;
SIGNAL goset        : std_logic;
SIGNAL start        : std_logic;
SIGNAL endwr        : std_logic;
SIGNAL enabshft     : std_logic;
SIGNAL endshft      : std_logic;
SIGNAL zeroes6      : std_logic;
SIGNAL zeroes5      : std_logic;
SIGNAL endshft2     : std_logic;
SIGNAL sclk_loc     : std_logic;
SIGNAL dwr_loc      : std_logic_vector(dwr'LENGTH DOWNTO 0);
SIGNAL drd_loc      : std_logic_vector(drd'HIGH DOWNTO 0);
BEGIN
goset_proc: PROCESS(reset, start, go)
BEGIN
        IF reset = '1' OR start = '1' THEN
                goset <= '0';
        ELSIF go'event and go = '1' THEN
                goset <= '1';
        END IF;
END PROCESS goset_proc;
sclken_proc: PROCESS(reset, clk)
BEGIN
        IF reset = '1' THEN
                sclken <= '0';
        ELSIF clk'EVENT AND clk = '1' THEN
                sclken <= ((start AND enable) OR sclken) AND (NOT
endwr);
        END IF;
END PROCESS sclken_proc;
endshft_proc: PROCESS(reset, clk)
BEGIN
        IF reset = '1' THEN
                enabshft <= '0';
        ELSIF clk'EVENT AND clk = '1' THEN
                enabshft <= (start OR enabshft) AND (NOT zeroes6);
        END IF;
END PROCESS enshft_proc;
par2ser_proc: PROCESS(reset, clk)
BEGIN
        IF reset = '1' THEN
                dwr_loc(0) <= '1';
                dwr_loc(dwr_loc'HIGH DOWNTO 1) <= (OTHERS => '0');
        ELSIF clk'EVENT AND clk = '1' THEN
                IF start = '1' OR (endwr = '1' AND (clk_idle XOR
enable)=
                '1') THEN dwr_loc <= dwr & '1';
                ELSIF (clk_idle XOR enable) = '1' AND enabshft ='1'
THEN
                        loop1: FOR j IN dwr_loc'HIGH DOWNTO dwr_
                        loc'LOW + 1
                        LOOP
                                dwr_loc(j) <= dwr_loc(j - 1);
                        END LOOP;
                        dwr_loc(dwr_loc'LOW) <= '0';
                END IF;
        END IF;
END PROCESS par2ser_proc;
ser2par_proc: PROCESS(reset, clk)
BEGIN
        IF reset = '1' THEN
                drd_loc <= (OTHERS => '0');
        ELSIF clk'EVENT AND clk = '1' THEN
                IF (NOT (clk_idle XOR enable)) = '1' AND enabshft = '1'
THEN
                        loop1: FOR j IN drd_loc'HIGH DOWNTO drd_
                        loc'LOW + 1
                        LOOP
                                drd_loc(j) <= drd_loc(j - 1);
                        END LOOP;
                        drd_loc(drd_loc'LOW) <= din;
                END IF;
        END IF;
END PROCESS ser2par_proc;
endwr_proc: PROCESS(reset, clk)
BEGIN
        IF reset = '1' THEN
                endwr <= '0';
        ELSIF clk'EVENT AND clk = '1' THEN
                endwr <= endshft;
        END IF;
END PROCESS endwr_proc;
z5_proc: PROCESS(dwr_loc)
VARIABLE zeroes : std_logic;
BEGIN
        zeroes := '1';
        FOR j IN 0 TO dwr_loc'HIGH - 3 LOOP
                zeroes := zeroes AND (NOT dwr_loc(j));
        END LOOP;
        zeroes5 <= zeroes;
END PROCESS z5_proc;
z6_proc: PROCESS(dwr_loc)
VARIABLE zeroes : std_logic;
BEGIN
        zeroes := '1';
        FOR j IN 0 TO dwr_loc'HIGH - 2 LOOP
                zeroes := zeroes AND (NOT dwr loc(j));
        END LOOP;
        zeroes6 <= zeroes;
END PROCESS z6_proc;
shft2_proc: PROCESS(reset, clk)
BEGIN
        IF reset = '1' THEN
                endshft2 <= '0';
        ELSIF clk'EVENT AND clk = '1' THEN
                endshft2 <= zeroes5;
        END IF;
END PROCESS shft2_proc;
sclk_proc: PROCESS(reset, clk)
BEGIN
        IF reset = '1' THEN
                sclk_loc <= '0';
        ELSIF clk'EVENT AND clk = '1' THEN
                IF sclken = '1' THEN
                        sclk_loc <= NOT sclk_loc;
                END IF;
        END IF;
END PROCESS sclk_proc;
start_proc: PROCESS(reset, clk)
```

```
-continued

BEGIN
    IF reset = '1' THEN
        start <= '0'
    ELSIF clk'EVENT AND clk = '1' THEN
        IF enable = '0' THEN
            start <= goset AND (NOT start);
        END IF;
    END IF;
END PROCESS start_proc;
endshft    <= endshft2 WHEN clk_idle = '1' ELSE
              zeroes6;
dout       <= dwr_loc(dwr_loc'HIGH);
sclk       <= clk_idle XOR sclk_loc;
done       <= NOT (sclken OR endwr);
drd        <= drd_loc;
END behavior;
```

Described above are embodiments of the invention meeting the aforementioned and other objects. Those skilled in the art will appreciate that these embodiments are merely examples of the invention, and that others incorporating modifications thereto fall within the scope of the invention. Thus, for example, the invention may be practiced with SPI-compatible devices utilizing inter-device signals in addition to (or other than) those shown above. By way of further example, it may be used for transfer transactions other than the continuous read operations discussed in detailed above. Still further, of course, the invention may be used to transfer information between SPI compatible devices, other than the A/D converters and processors shown herein.

I claim:

1. A system for process control comprising
   a processor,
   a field device, the field device, comprising any of a flowmeter, pressure sensor, temperature sensor, level sensor, valve, recorder, positioner, and other field device,
   an input/output module coupled to the processor and the field device, the input/output module comprising:
      a first serial peripheral interface (SPI) in serial communication with a second SPI, the second SPI being coupled to the field device,
      first transfer logic section, coupled with the first SPI, that transfers a multi-bit datum between the processor and the field device via the first and second SPIs,
      second transfer logic section, coupled with the first transfer logic section, that effects a transfer transaction between the processor and the field device, the transfer transaction comprising transfer of a plurality of multi-bit datum relating to any of a common data access operation and a common data generation operation,
      the second transfer logic section effecting any of a continuous read data transfer operation and a continuous write data transfer operation by repeatedly performing steps of
         (i) invoking the first transfer logic section to transfer between the processor and the field device, via the first and second SPIs, one or more multi-bit commands for effecting an individual data transfer operation, and
         (ii) invoking the first transfer logic to transfer between the processor and the field device, via the first and second SPIs a multi-bit data comprising that individual data transfer,
      wherein the second transfer logic section causes the first logic section to check a "data ready" bit prior to each of multi-bit transfer that comprises said individual data transfer.

2. A system according to claim 1, wherein the second transfer logic section comprises a state machine that determines which multi-bit datum of the plurality of multi-bit datum the second transfer logic section invokes the first transfer logic section to transfer with the field device.

3. A system according to claim 2, wherein the field device comprises interface logic that any of transforms and conditions signals transferred via the first and second SPIs.

4. A system according to claim 3, wherein the interface logic comprises any of an analog-to-digital converter and a digital-to-analog converter.

5. A control system comprising
   an embedded processor,
   a field device, the field device comprising any of a flowmeter, pressure sensor, temperature sensor, level sensor, valve, recorder, positioner, and other field device used in any of process control, environmental control and other control system application,
   an input/output module coupled to the processor and the field device, the input/output module comprising:
      a first serial peripheral interface (SPI) in serial communication with a second SPI, the second SPI being coupled to the field device,
      first transfer logic section, coupled with the first SPI, that transfers a multi-bit datum between the processor and the field device via the first and second SPIs,
      second transfer logic section, coupled with the first transfer logic section, that effects a transfer transaction between the processor and the field device, the transfer transaction comprising transfer of a plurality of multi-bit datum relating to any of a common data access operation and a common data generation operation,
      the second transfer logic section effecting any of a continuous read data transfer operation and a continuous write data transfer operation by repeatedly performing steps of
         (i) invoking the first transfer logic section to transfer between the processor and the field device, via the first and second SPIs, one or more multi-bit commands for effecting an individual data transfer operation, and
         (ii) invoking the first transfer logic to transfer between the processor and the field device, via the first and second SPIs a multi-bit data comprising that individual data transfer,
      wherein the second transfer logic section causes the first logic section to check a "data ready" bit prior to each of multi-bit transfer that comprises said individual data transfer.

6. A control system according to claim 5, wherein the second transfer logic section comprises a state machine that determines which multi-bit datum of the plurality of multi-bit datum the second transfer logic section invokes the first transfer logic section to transfer with the field device.

7. A control system input/output method of transferring information between a processor and a control device, the method comprising:
   a multi-bit datum transfer step that selectively transfers a multi-bit datum between the processor and the control device over a serial peripheral interface (SPI),
   a transaction transfer step that invokes the multi-bit datum transfer step to effect a transfer transaction between the processor and the control device, the transfer transaction comprising transfer of a plurality of multi-bit datum relating to any of a common data access operation and a common data generation operation, wherein the transaction transfer step effects a transfer transaction any of a continuous read of a plurality of multi-bit datum and a continuous write of a plurality of multi-bit datum between the first and second SPIs by invoking the multi-bit transfer step to repeatedly perform steps of (i) invoking the multi-bit transfer step to transfer between the processor and the control device, via the first and second SPIs, one or more multi-bit commands for effecting an individual data transfer operation, and (ii) invoking the multi-bit transfer step to transfer between the processor and the control device, via the first and second SPIs a multi-bit data comprising that individual data transfer, wherein the second transfer logic section causes the first logic section to check a "data ready" bit prior to each of multi-bit transfer that comprises said individual data transfer.

8. A control system input/output method according to claim 7, wherein the control device comprises any of a flowmeter, pressure sensor, temperature sensor, level sensor, valve, recorder, positioner, and other field device used in any of process control, environmental control and other control system application, and wherein the control device optionally comprises any of an analog-to-digital converter, a digital-to-analog converter, and other interface logic that any of transforms and conditions signals transferred between the between the processor and the control device.

9. A control system input/output method according to claim 7, wherein the transaction transfer step effects the transfer transaction by invoking the multi-bit transfer step to interleave one or more multi-bit commands with one or more multi-bit data.

10. A control system input/output method according to claim 9, wherein the transaction transfer step comprises executing a state machine.

11. A control system input/output method according to claim 10, wherein a state of the state machine determines which multi-bit datum the transaction transfer step invokes the multi-bit datum transfer step to transfer with the control device.

12. A control system input/output method according to claim 7, wherein the transaction transfer step comprises executing a state machine that determines which multi-bit datum of the plurality of multi-bit datum the transaction transfer step invokes the multi-bit transfer step to transfer with the control device.

* * * * *

UNITED STATES PATENT AND TRADEMARK OFFICE
CERTIFICATE OF CORRECTION

PATENT NO.     : 6,691,183 B1
DATED          : February 10, 2004
INVENTOR(S)    : Lawrence H. Ryan It is certified that error appears in the above-identified patent and that said Letters Patent is hereby corrected as shown below:

Column 21,
Line 34, following "the field device:"; delete the symbol ","

Signed and Sealed this

Twenty-ninth Day of June, 2004

JON W. DUDAS
*Acting Director of the United States Patent and Trademark Office*